(12) United States Patent
Tilly et al.

(10) Patent No.: US 8,365,509 B2
(45) Date of Patent: Feb. 5, 2013

(54) AGRICULTURAL HARVESTING MACHINE WITH HEIGHT-ADJUSTABLE SUPPORT DEVICE

(75) Inventors: Thomas Tilly, Warendorf (DE); Manfred Pollklas, Rheda-Wiedenbrueck (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 516 days.

(21) Appl. No.: 12/603,199

(22) Filed: Oct. 21, 2009

(65) Prior Publication Data

US 2010/0115906 A1 May 13, 2010

(30) Foreign Application Priority Data

Nov. 7, 2008 (DE) .......................... 10 2008 056 297

(51) Int. Cl.
*A01B 73/00* (2006.01)

(52) U.S. Cl. ........................................... 56/228; 701/50

(58) Field of Classification Search .................... 701/50, 701/37, 41; 303/9.69, 9.64, 137, 9.61, 9.65, 303/9.62; 188/195; 56/228, 14.9; 172/311; 280/6.159, 6.15, 6.151, 6.155, 6.157

See application file for complete search history.

(56) References Cited

U.S. PATENT DOCUMENTS

| | | | | |
|---|---|---|---|---|
| 2,844,161 A * | 7/1958 | Ostwald | .................... | 137/118.06 |
| 3,608,753 A * | 9/1971 | Scott | .............................. | 414/345 |
| 4,371,299 A * | 2/1983 | Cain et al. | ........................ | 410/44 |
| 4,384,445 A * | 5/1983 | McIlwain | ........................ | 56/228 |
| 4,707,037 A * | 11/1987 | Rudiger | ........................ | 303/9.69 |
| 4,770,577 A * | 9/1988 | Farris | ................................. | 410/2 |
| 5,243,810 A * | 9/1993 | Fox et al. | ........................ | 56/228 |
| 5,361,569 A * | 11/1994 | Schupman et al. | ............. | 56/228 |
| 5,970,695 A * | 10/1999 | Dunn | ................................. | 56/228 |
| 6,209,297 B1* | 4/2001 | Yeomans et al. | ................. | 56/228 |
| 6,282,875 B1 | 9/2001 | Holtkotte et al. | | |
| 7,162,854 B2* | 1/2007 | Yeomans et al. | ............... | 56/14.9 |
| 7,197,865 B1* | 4/2007 | Enns et al. | ........................ | 56/228 |
| 7,219,965 B2* | 5/2007 | Wagner | ........................ | 303/9.64 |
| 7,347,277 B2* | 3/2008 | Enns et al. | ..................... | 172/311 |
| 7,431,309 B2* | 10/2008 | Kobayashi | ................. | 280/6.159 |
| 2006/0150605 A1 | 7/2006 | Wubbels et al. | | |
| 2009/0030581 A1* | 1/2009 | Pollklas et al. | ................. | 701/50 |

FOREIGN PATENT DOCUMENTS

DE 199 18 551 10/2000
DE 10 2005 001 412 7/2006

* cited by examiner

*Primary Examiner* — Arpad Fabian-Kovacs
(74) *Attorney, Agent, or Firm* — Michael J. Striker

(57) ABSTRACT

A self-propelled agricultural harvesting machine has at least one height-adjustable pick-up device for adapting an agricultural front attachment which is supported via at least one support wheel which, when in the transport position, is in contact with the ground. A braking device brakes the wheels of the agricultural harvesting machine. A control device regulates the ground pressure of the at least one support wheel on the ground when the braking device is activated.

10 Claims, 2 Drawing Sheets

AGRICULTURAL HARVESTING MACHINE WITH HEIGHT-ADJUSTABLE SUPPORT DEVICE

CROSS-REFERENCE TO RELATED APPLICATION

The invention described and claimed hereinbelow is also described in DE 10 2008 056 297.1 filed on Nov. 7, 2008. This German Patent Application, whose subject matter is incorporated here by reference, provides the basis for a claim of priority of invention under 35 U.S.C. 119(a)-(d).

BACKGROUND OF THE INVENTION

The present invention relates to a self-propelled agricultural harvesting machine that includes an installed front attachment which is supported when in a non-working position by at least one support wheel system which is in contact with the ground, and that includes a braking device.

The output of agricultural harvesting machines continues to increase, thereby requiring the use of increasingly larger and heavier front attachments. Typically, headers of combine harvesters are detached from the combine harvester and placed on a carriage in order to be hauled on the road. In contrast, corn headers and corn pickers are typically not detached from forage harvesters in preparation for travel on the road; instead, they remain attached to the forage harvester. In preparation for travel on the road, these front attachments can be folded using different types of folding mechanisms, in order to decrease their width, as is the case with grain-cutting devices.

A disadvantage of this is the fact that, since the front attachment is situated on the carriage and the weight is therefore shifted onto the individual axles, in particular due to the reduction of the load on the front braked drive axle, the harvesting machine requires a longer braking distance once braking is activated, with the result that limits in terms of a maximum permissible braking distance are exceeded. There is also the problem that, when the load on the front braked drive axle is too great, the rear of the harvesting machine is lifted off of the ground during braking.

DE 199 18 551 makes known an agricultural harvesting machine designed as a forage harvester that includes an intermediate attachment on the front side that accommodates an agricultural working device. To ensure that the load of the agricultural working device need not be supported exclusively by the carrier vehicle axle situated at the front relative to the direction of travel, it is provided in at least one embodiment that support wheels are assigned to the intermediate attachment that make it possible for at least a portion of the mass of the agricultural working device to be supported on the ground via these support wheels so that, provided that the support wheel is in contact with the ground, a distribution of axle load is attained that fulfills the applicable requirements. The disadvantage of this, however, is that, given that the available support wheel absorbs a partial load of the installed front attachment, the resultant distribution of axle load negatively affects the braking procedure in that the axle load on the braked drive axle is no longer sufficient, with the result that limits in terms of a permissible maximum braking distance may be exceeded.

Publication DE 10 2005 001 412 A makes known a carriage which is used to support a front harvesting attachment which is installed on a harvesting machine. To relieve weight from the wheels of the harvesting machine, the carriage includes at least one wheel that extends downward and that is installed on the carriage frame using a resilient element. Spring action is attained using a hydraulic cylinder which is connected to a pressure reservoir and forms a closed system which may be separated from the hydraulic system of the harvesting machine for travel on the road. The pressure is adjusted in such a manner that a desired drivability of the carriage may be attained.

SUMMARY OF THE INVENTION

The object of the present invention, therefore, is to avoid the disadvantages of the cited related art and to further develop a harvesting machine of the type described initially such that a harvesting machine that includes a front harvesting attachment which is supported by a support wheel having contact with the ground during travel on the road maintains a safe braking distance and does not exceed limits in terms of a permissible maximum braking distance.

In keeping with this object and with others which will become apparent hereinafter, one feature of the present invention resides, briefly stated, in a self-propelled agricultural harvesting machine, has an agricultural front attachment which, when in a transport position, is supported by at least one support meal having contact with a ground; at least one height-adjustable support device for adapting the agricultural front attachment; a braking device for braking wheels of the agricultural harvesting machine; and a control device for regulating a ground pressure of the at least one support wheel on the ground when the braking device is activated.

Given that a control device is provided that regulates the ground pressure of the at least one support wheel on the ground when the braking device of the harvesting machine is activated, it is possible to regulate the distribution of axle load and, in particular, to shift vehicle weight to the driven and braked drive axle of the harvesting machine, thereby making it possible to maintain a safe braking distance and ensure that limits in terms of a permissible maximum braking distance are not exceeded, even when large front attachments are supported during travel on the road by a support wheel having contact with the ground.

In an advantageous further development of the present invention, the control device is operatively connected to at least one lifting cylinder which is located on the support device, the ground pressure of the at least one support wheel is regulated via the application and release of pressure to and from the at least one lifting cylinder, and the pressure value in the at least one lifting cylinder is increased when the braking device is activated, thereby advantageously shifting a portion of the weight of the front attachment which is supported by the support wheel to the braked drive axle, thereby increasing the traction of the wheels of the front drive axle and increasing the braking action.

In a further embodiment of the present invention, the control device brings about an increase in the pressure value in at least one lifting cylinder before the speed of the harvesting machine is reduced via the activation of the braking device, thereby shifting a partial load of the installed front attachment off of the support wheel and onto the front drive axle before the speed of the harvesting machine decreases, in order to increase the braking action of the braked drive axle via improved traction of the wheels of the drive axle, thereby ensuring, in particular, that stipulated limits regarding braking distance are not exceeded.

Given that, when the braking device is activated, the pressure value of the at least one lifting cylinder is regulated as a function of the axle load on the drive axle and/or the steering axle of the harvesting machine, it is ensured that the optimal pressure value in at least one lifting cylinder may be adjusted in order to adjust the axle loads in order to maintain a safe braking distance of the harvesting machine.

In a further advantageous embodiment of the present invention, the pressure value of the at least one lifting cylinder mounted on the support device is regulated as a function of the type of front attachment that is installed, so that, when the braking device of the harvesting machine is activated, the pressure control may be adapted to the particular front attachment that is installed, and to its weight, and so that the traction of the braked wheels of the drive axle may be improved, thereby making it easier—for an inexperienced operator in particular—to brake the harvesting machine even when a front attachment is installed and supported. Ideally, the type of front attachment that is installed is also taken into account, so that pressure values in at least one lifting cylinder may be adjusted when the braking device is activated, in order to bring about a targeted loading and unloading of the braked front axle in particular.

In a further embodiment of the present invention, the pressure value in at least one lifting cylinder is not increased until the pressure value is outside of a predefined tolerance range.

In a preferred embodiment, the drive axle and/or the steering axle of the harvesting machine may be equipped with at least one load-sensing sensor which transmits load-dependent signals to a control device, and the control device regulates the pressure value in at least one lifting cylinder as a function of the signals when the braking device is activated in order to ensure that the harvesting machine may be braked safely. The control device preferably increases the pressure value in at least one lifting cylinder when a definable setpoint axle load on the drive axle and/or the steering axle is fallen below when the braking device is activated. On the other hand, the control device lowers the pressure value in the hydraulic cylinder when a definable setpoint axle load on the drive axle and/or the steering axle is exceeded when the braking device is activated.

If the installed front attachment to be transported is relatively wide and heavy, it has proven advantageous for the at least one support wheel to be mounted on a carriage which may be slid under the front attachment and/or the harvesting machine and locked in position there, thereby ensuring that a larger contact area exists against which the front attachment may be placed, to prevent the rear of the harvesting machine from lifting up during the braking procedure of the harvesting machine in particular. In a specific embodiment, the carriage includes a frame structure and at least one downwardly extending support wheel; the frame structure for supporting the front attachment and relieving weight from the front axle and/or steering axle of the harvesting machine during transport travel is detachably fastened to the front attachment mounted on the harvesting machine, and it may be separated from the front attachment for harvesting operation.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
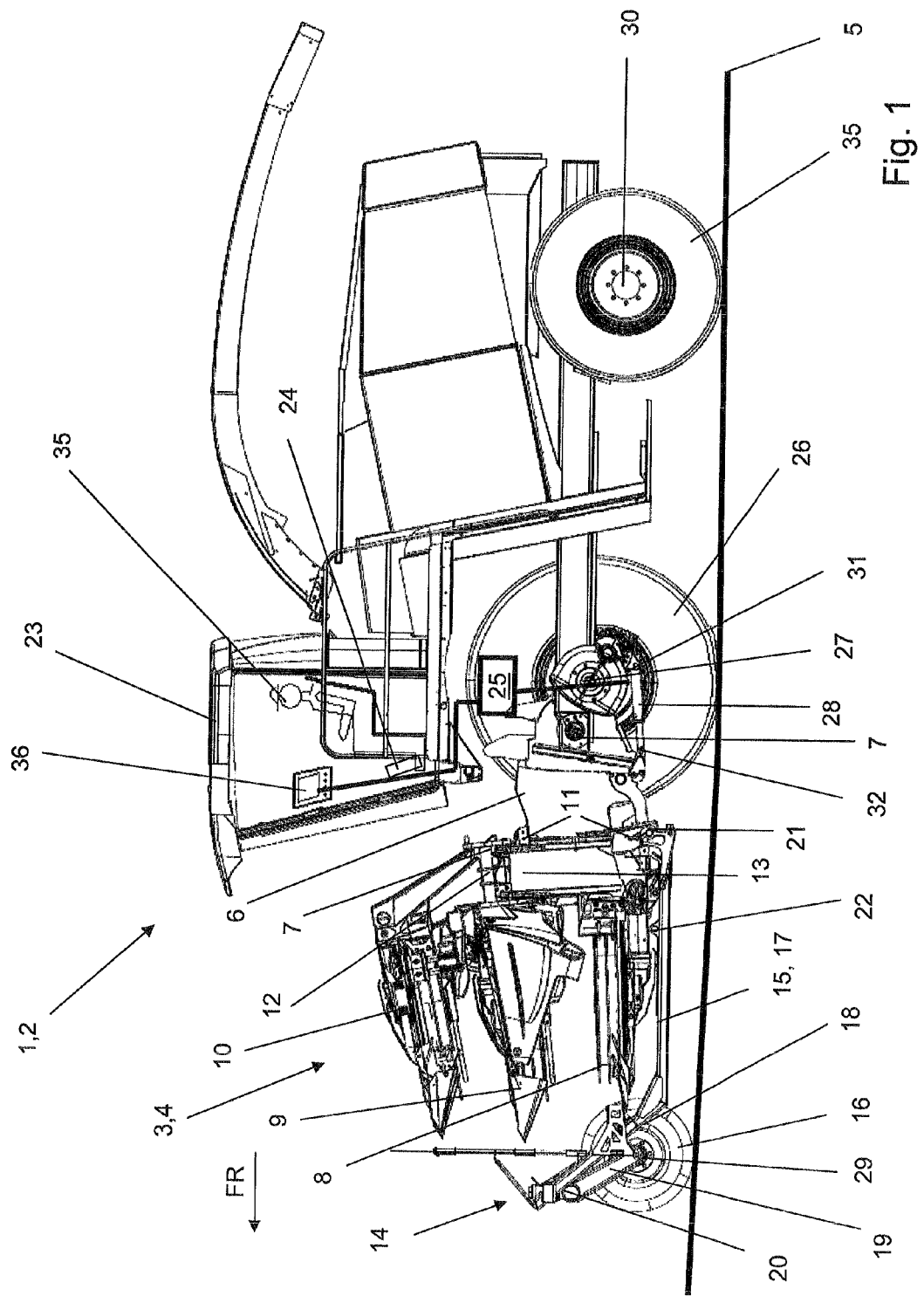
FIG. 1 shows a schematic depiction of an agricultural harvesting machine in the form of a forage harvester including an installed front attachment that has been placed on a carriage.

FIG. 1 shows a side view of a self-propelled harvesting machine 1 which is designed as a forage harvester 2, to the front side—relative to direction of travel FR—of which a front attachment 3 designed as a corn header 4 is assigned. Front attachment 3 is used to pick up and cut the crop material from ground 5 so that it may be directed to the downstream working assemblies which are not depicted here. A support device, which takes a form of a feeder housing 6 is located downstream of front attachment 3, it being possible for the support device, i.e., the feeder housing 6 to be swiveled vertically relative to direction of travel FR about a pivot axis 7 in order to compensate for the longitudinal inclination.

Front attachment 3 is designed to be foldable, and it is composed of three sections 8, 9, 10; middle section 9 is connected via coupling points 11 to feeder housing 7 of forage harvester 2. Outer sections 8, 10 are connected to either side of middle section 9; outer sections 8, 10 are folded upward in swivel bearings 12 which bear against the back side of central machine frame 13 on bearing consoles (not depicted). The folded-upward position is also the transport position of front attachment 3. Using this foldable design, it is possible to realize working widths of up to approximately 9 meters, for instance. A carriage 14 which includes a frame structure 15 and a support wheel 16 which is situated in front and is in contact with ground 5 is used to support front attachment 3 while it is being transported. Carriage 14 may be removed before the harvesting operation is begun.

Frame structure 15 is composed of two rearward support elements 17 which are situated laterally next to one another and extend nearly horizontally underneath front attachment 3. Upwardly slanted braces 18 extend on front—relative to direction of travel FR—end side of particular support element 17. Support wheel 16 is located on a rocker arm 19 which extends downward at a slight slant and is hingedly connected to top brace 18. Support wheel 16 is hingedly connected to rocker arm 19 such that it may rotate about its rotational axis 20. Front attachment 3 is attached to carriage 14 at a coupling point 21 in the end-side region of particular support element 17 which extends nearly horizontally. While front attachment 3, together with carriage 14, is fixed in coupling point 21, it may swivel vertically about a horizontal axis, and it assumes a floating position. In the state in which it is placed on carriage 14, center section 9 of folded front attachment 3 rests on support point 22 of carriage 15, so that a definable weight component of front attachment 3 is supported by carriage 14.

Due to the floating position of carriage 14, support wheel 16—which is located ahead of front attachment 3—of carriage 14 may follow uneven ground contours, and it remains in contact with the ground at all times during transport travel. A braking device for harvesting machine 1, which absolutely must be provided at all times, is not shown in detail in the figures, to ensure clarity. In the embodiment shown, the braking procedure is initiated via the actuation of brake pedal 24 which is located in driver's cab 23. The assemblies used to operate the braking device are not shown in greater detail. The design and configuration thereof are easily handled by a person skilled in the art.

To ensure that harvesting machine 1 may be braked safely during transport travel with front attachment 3 installed and supported, it is provided according to the present invention that a control device 25 is assigned to harvesting machine 1 and controls the ground pressure of the at least one support wheel 16 on ground 5 when the braking device is actuated, i.e., upon actuation of brake pedal 24 in this case, thereby resulting in a distribution of axle load that brings about increased traction of braked wheels 26 of drive axle 27, thereby increasing the safety of the braking distance and ensuring that limits in terms of a permissible maximum braking distance are not exceeded. In the embodiment, when brake pedal 24 is actuated, the ground pressure is regulated using lifting cylinders 28 situated on both sides of feeder housing 6 of harvesting machine 1 via the application and release of pressure to and from lifting cylinders 28, thereby making it possible to attain a definable displacement of vehicle weight onto support wheel axle 29 of carriage 14, onto drive axle 27, and onto steering axle 30 of harvesting machine 1. It is also feasible for feeder housing 6 to be supported via only one lifting cylinder 28 or via any number of lifting cylinders 28.

Lifting cylinders 28 are rotatably supported in the lower region of front drive axle 27 in a pivot point 27; the particular piston rod of lifting cylinders 28 is rotatably supported laterally in a pivot point 31 in the lower region of feeder housing 6. Lifting cylinders 28 are single-acting in design (not depicted), and they are operatively connected via a line 33 to control device 25. In the simplest case, in order to control lifting cylinders 28, a pressure-control valve 34 which will be described in greater detail with reference to FIG. 2 may be assigned to lifting cylinders 28.

Figure 2:
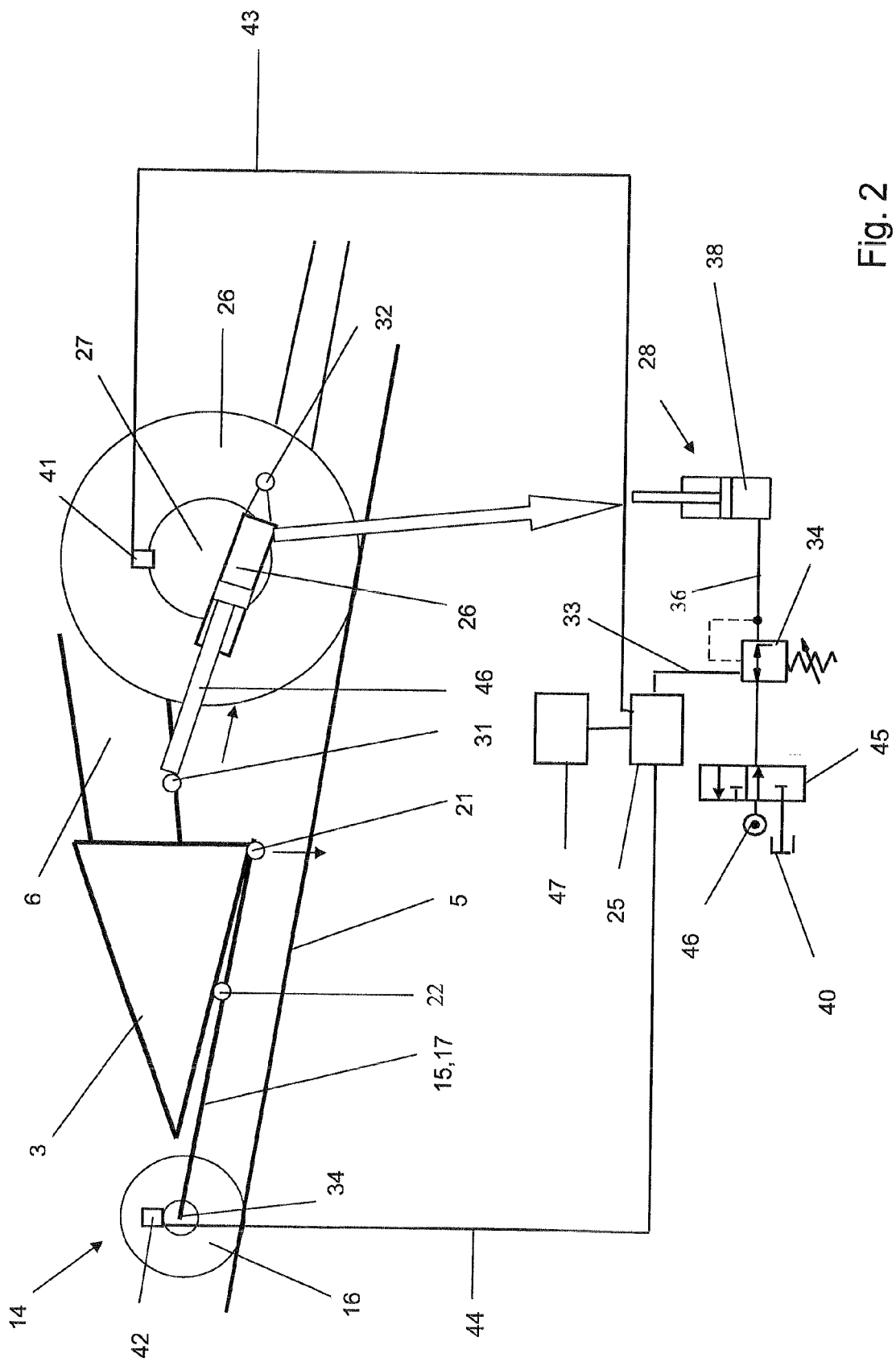
FIG. 2 shows a schematic illustration of a front attachment that has been placed on a carriage and that includes the control device according to the present invention.

Load-sensing sensors which are shown in greater detail in FIG. 2 are assigned to drive axle 27 and/or steering axle 30 of harvesting machine 1 and support wheel axle 29 of carriage 14; the load-sensing sensors are designed, e.g., as pressure sensors for ascertaining the wheel pressure of wheels of harvesting machine 1 and support wheel 16. The load-sensing sensors generate input signals, which are not shown here in greater detail, as a function of the particular axle load. In this manner, it is also possible to determine the distribution of axle load as a function of the support of the front attachment by support wheel 16 on ground 5 when the braking device is actuated in order to brake the harvesting machine. It is also feasible to utilize the pressure in lifting cylinder 28 installed on feeder housing 6 as an indicator for determining the axle load on drive axle 23 and/or steering axle 30, in order to obtain information about the current axle loads.

When brake pedal 24 is actuated, control device 25 receives a brake signal via a connecting line. Depending on the particular current distribution of axle load which is ascertained using the load-sensing sensors, control device 25—when performing a controlling function—increases the pressure value in lifting cylinder 28 by applying pressure to it, thereby shifting a partial load, which is absorbed by support wheel 16, from installed front attachment 3 to braked drive axle 27 so that stipulated axial loads may be complied with during transport travel, and so that wheels 26 mounted on drive axle 27 have better traction and bring about a greater braking effect when harvesting machine 1 is braked.

If the load-sensing sensor mounted on steering axle 30 senses that the axle load is reduced during the braking procedure, which indicates that wheels 35 mounted on steering axle 30 are about to lift off of ground 5, control device 25 sends an appropriate signal to the pressure system of lifting cylinder 28 which results in a reduction in the pressure value via the release of pressure from lifting cylinder 28, and in a displacement of weight to support wheel 16 which supports installed front attachment 3. It is also feasible for the particular current ground speed of harvesting machine 1 that exists before the braking procedure takes place to be taken into account in the ground-pressure control during the braking procedure, in order to distribute the axle load.

Preferably, a display unit 36 is provided for displaying the selected pressure value and the actual pressure value in driver's cab 23, thereby ensuring that operator 37 of harvesting machine 1 remains in control of the pressure regulation of the at least one lifting cylinder 28 situated on feeder housing 6. The related axle loads on support wheel 29 and/or on drive axle 27 and/or on steering axle 30 may also be displayed.

In a further advantageous development of the present invention, control device 25 brings about an increase in the pressure value in at least one lifting cylinder 28 before the speed of harvesting machine 1 is reduced via the activation of the braking device, thereby shifting a partial load of installed front attachment 3 from support wheel 16 and onto front drive axle 27 before the braking action of the braking device has set in, in order to increase the braking action of braked drive axle 27 via improved traction of wheels 26 on drive axle 27, thereby ensuring, in particular, that stipulated limits related to braking distance are not exceeded.

A preferred embodiment is characterized by the fact that control device 25 may be turned on and off. This ensures that experienced operator 37 may control the braking procedure by distributing the axle load, and that experienced operator 37 may automatically control the distribution of axle load by activating control device 25.

In a further embodiment of the present invention, control device 25 does not increase the pressure value in at least one lifting cylinder 28 until the pressure value is outside of a predefined tolerance range, thereby ensuring that pressure is not continually applied to and released from lifting cylinder 28, which would cause wheels 26 to jump. In a preferred embodiment, when the braking device is actuated, a display unit 36 located in driver's cab 23 indicates that a definable setpoint axle load on drive axle 27 and/or steering axle 30 has been exceeded and/or fallen below via an acoustic and/or optical warning message, thereby ensuring that operator 37 of harvesting machine 1 is notified that wheels 26 on drive axle 27 have less traction, e.g., when a definable setpoint axle load on drive axle 27 is fallen below, and/or, e.g., that a definable setpoint axle load on steering axle 30 has been fallen below, which indicates that wheels 35 located on steering axle 30 are about to lift off of the ground, thereby enabling operator 37 to manually adjust the pressure value in at least one lifting cylinder 28 so that a safe braking procedure may be realized. An input device which is not depicted here is provided in driver's cab 23 for operating the control device and entering pressure values.

FIG. 2 shows a schematic illustration of a front attachment 3 installed on a feeder housing 6 of a harvesting machine (not depicted); front attachment 3 is connected at a coupling point 21 to a carriage 14 which includes a support wheel 16. In the variant of the embodiment shown, harvesting machine 1 which includes carriage 14 is engaged in transport travel uphill. To control the ground pressure of support wheel 16 on ground 5, a lifting cylinder 28 is mounted on the side of feeder housing 6, and is situated at one end in pivot point 31 such that it may pivot with feeder housing 6, and it is pivotably situated (not depicted) at the other end in the lower region of braked drive axle 27. Lifting cylinder 28 is single-acting in design; piston-surface side 38 of lifting cylinder 28 is connected via a line 40 to at least one electronic pressure-control valve 41. The pressure in line 40 may be adjusted using pressure-control valve 41; if the selected threshold pressure value is exceeded, pressure-control valve 34 connects line 39 to tank 40, so that a portion of the energy-transferring medium may flow into tank 40. It is therefore made possible to regulate the distribution of axle load from lifting cylinder(s) 28 of feeder housing 6 to support wheel 16 and drive axle 27 and/or steering axle 30 (not depicted) of the harvesting machine.

To determine the axle load, one load sensor 41, 42 each is assigned to support wheel 16 and to braked drive axle 27, each of which is connected via a line 43, 44 to control device 25. A load-sensing sensor may also be assigned to the steering axle, although this is not depicted. In addition, line 39 is connected via a switchable 2/2 displacement valve 45 to integrated pump 46 or tank 40. When pressure is applied to line 39, piston rod 48 is pushed out of lifting cylinder 28. Feeder housing 6 then performs a swivel motion about its pivot axis which is located on harvesting machine 1 and is not depicted here, into a position far from the ground. At the same time, support wheel 16 located on carriage 14 remains on ground 5 due to its floating position. Given that lifting cylinder 26 is single-acting in design, the gravity-induced lowering of feeder housing 6 also results in the retraction of piston rod 46 of lifting cylinder 28. If braking device 47 connected to control device 25 is now activated via the actuation of the braking pedal (not depicted), control device 25 sends a signal to the pressure system to increase the pressure value in lifting cylinder 28, thereby shifting a definable partial load of installed front attachment 3 that is supported by carriage 14, in particular onto drive axle 27 of the harvesting machine in order to increase the traction of wheels 26 of drive axle 27 and to thereby increase the braking action.

When the braking procedure is applied during transport travel uphill, it must be taken into account that the entire weight of harvesting machine 1—given that it supports the braking procedure as a force component, due to the force of gravity—has less of an effect on the weight displacement in favor of braked drive axle 27 than is the case when the harvesting machine would travel downhill, in which case the increase in the pressure value in lifting cylinder 28 is greater than that which takes place during a braking procedure carried out on a horizontal path. It is feasible that a tilt sensor which is known per se and is not depicted here is assigned to harvesting machine 1 in order to regulate the ground pressure during the braking procedure in accordance with the sensed tilt of harvesting machine 1 relative to the ground, and, therefore, to regulate the distribution of the axle load, in order to safely brake harvesting machine 1.

Given that carriage 14, in the state in which it is installed on front attachment 3, follows uneven ground contours in a floating manner, and that support wheel 16 therefore continually remains in contact with ground 5, even when the braking procedure is carried out while traveling across uneven ground, the desired distribution of axle load may be controlled using control device 25 by applying pressure to or releasing pressure from lifting cylinder 28, so that wheels 26 of braked drive axle 27 have greater traction when harvesting machine 1 is braked, thereby increasing the braking action.

It is within the scope of the ability of one skilled in the technical art to modify the exemplary embodiment described in a manner not presented, in order to achieve the effects described, without leaving the framework of the present invention.

It will be understood that each of the elements described above, or two or more together, may also find a useful application in other types of constructions differing from the types described above.

While the invention has been illustrated and described as embodied in an agricultural harvesting machine with a rotor bearing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A self-propelled agricultural harvesting machine, comprising
    an agricultural front attachment which, when in a transport position, is supported by at least one support wheel having contact with a ground;
    at least one height-adjustable feeder housing device to which said agricultural front attachment is attached and configured to swivel vertically relative a direction of travel to compensate for longitudinal inclination;
    a braking device for braking wheels of the agricultural harvesting machine; and
    a control device for regulating a ground pressure of the at least one support wheel on the ground when said braking device is activated.

2. The self-propelled agricultural harvesting machine as defined in claim 1, further comprising
    at least one lifting cylinder located on said feeder housing, wherein said control device is operatively connected to said at least one lifting cylinder, so that the ground pressure of said at least one support wheel is controlled via an application and release of pressure to or from said at least one lifting cylinder, and when said braking device is activated, a pressure value in said at least one lifting cylinder is increased.

3. The self-propelled agricultural harvesting machine as defined in claim 2, wherein said control device controls an amount of increase in the pressure value of said at least one lifting cylinder as a function of the axle load on a drive axle, on a steering axle or both of the harvesting machine, as detected by load sensors positioned thereon.

4. The self-propelled agricultural harvesting machine as defined in claim 2, wherein said control device controls an amount of increase in the pressure value of said at least one lifting cylinder as a function of a type of said front attachment that is installed and through use of a signal generated by a load sensor positioned at the support wheel.

5. The self-propelled agricultural harvesting machine as defined in claim 2, wherein said control device does not increase the pressure value until a pressure value detected by a pressure sensor positioned at said at least one lifting cylinder is determined to be outside of a predefined tolerance range.

6. The self-propelled harvesting machine as defined in claim 2, further comprising at least one loading sensor which is provided on an element selected from the group consisting of a drive axle, a steering axle, and both of the harvesting machine and transmits load-dependent signals to said control device, which control device regulates the pressure value in said at least one lifting cylinder as a function of the load-dependent signals generated by the at least one load sensor when said braking device is activated.

7. The self-propelled agricultural harvesting machine as defined in claim 2, wherein said control device is configured so that if detection of an axle load on the drive axle or steering axle or both is determined to exceed a definable setpoint axle load upon activation of said braking device, through the use of a load sensor positioned on the drive axle or steering axle or both, said control device increases the pressure value in said at least one lifting cylinder.

8. The self-propelled agricultural harvesting machine as defined in claim 2, wherein said control device is configured so that if detection of an axle load on said drive axle or steering axle or both is determined to exceed a definable setpoint axle load upon activation of said braking device, through the use of a load sensor positioned on the drive axle or steering axle or both, said control device reduces the pressure value in said at least one lifting cylinder.

9. The self-propelled agricultural harvesting machine as defined in claim 1, further comprising a carriage on which said at least one support wheel is mountable and which is slidable under said front attachment and locked in a position there.

10. The self-propelled agricultural harvesting machine as defined in claim 9, wherein said carriage includes a frame structure and at least one downwardly extending wheel, such that said frame structure is detachably attachable to said front attachment which is mounted on the harvesting machine in order to support said front attachment and to relieve weight from a drive axle and/or a steering axle of the harvesting machine during transport travel while said carriage assumes a floating position in an attached state, and wherein said frame structure is separated from said front attachment in order to perform a harvesting operation.

* * * * *